US011952223B2

(12) United States Patent
Robbin et al.

(10) Patent No.: US 11,952,223 B2
(45) Date of Patent: Apr. 9, 2024

(54) DIP TREATMENT SYSTEM AND METHOD FOR THE DIP TREATMENT OF ARTICLES, IN PARTICULAR VEHICLE BODIES

(71) Applicant: EISENMANN GMBH, Böblingen (DE)

(72) Inventors: Jörg Robbin, Ammerbuch (DE); Herbert Schulze, Aidlingen (DE)

(73) Assignee: EISENMANN GMBH, Böblingen (DE)

( * ) Notice: Subject to any disclaimer, the term of this patent is extended or adjusted under 35 U.S.C. 154(b) by 418 days.

(21) Appl. No.: 17/053,124

(22) PCT Filed: May 2, 2019

(86) PCT No.: PCT/EP2019/061274
§ 371 (c)(1),
(2) Date: Jul. 6, 2021

(87) PCT Pub. No.: WO2019/215015
PCT Pub. Date: Nov. 14, 2019

(65) Prior Publication Data
US 2021/0331875 A1    Oct. 28, 2021

(30) Foreign Application Priority Data

May 9, 2018    (DE) ..................... 10 2018 111 202.5

(51) Int. Cl.
*B65G 47/64*    (2006.01)
*B05C 3/10*    (2006.01)
(Continued)

(52) U.S. Cl.
CPC ............ *B65G 49/0463* (2013.01); *B05C 3/10* (2013.01); *B05C 13/02* (2013.01); *B05D 1/18* (2013.01);
(Continued)

(58) Field of Classification Search
CPC ...................................................... B65G 47/64
See application file for complete search history.

(56) References Cited

U.S. PATENT DOCUMENTS

| 929,880 A | * | 8/1909 | Roach | ....................... B61L 5/02 |
| | | | | 246/145 |
| 2,928,356 A | | 6/1956 | Tredwell | |
| | | (Continued) | | |

FOREIGN PATENT DOCUMENTS

| CH | 293 120 | 9/1953 |
| CN | 1305937 | 8/2001 |
| | (Continued) | |

OTHER PUBLICATIONS

Office Action in related CN App. No. 201980038704.9 dated Feb. 10, 2022, 7 pages.

*Primary Examiner* — Cachet I Proctor
(74) *Attorney, Agent, or Firm* — SCHROEDER INTELLECTUAL PROPERTY LAW GROUP, LLC (57) ABSTRACT

A dip treatment system for treating articles, in particular for treating vehicle bodies, includes a dip treatment tank, which can be filled with a treatment liquid, into which articles to be treated can be fully or partially dipped. A conveying system defines a conveying path and includes at least one transport carriage, which can be displaced along the conveying path in a transport direction and includes a fastening device, to which at least one article can be fastened. The conveying system can convey the articles to be treated towards the dip treatment tank, fully or partially into the interior of the dip treatment tank, out of the dip treatment tank and away therefrom. The conveying path of the conveying system is divided into sub-paths, of which at least one first sub-path leads to the dip treatment tank or to an immersion region of the dip treatment tank and of which a second sub-path passes (Continued)

by said dip treatment tank or immersion region of said dip treatment tank. The invention further includes a method for the dip treatment of articles.

11 Claims, 5 Drawing Sheets

(51) Int. Cl.
  *B05C 13/02* (2006.01)
  *B05D 1/18* (2006.01)
  *B62D 65/00* (2006.01)
  *B65G 49/04* (2006.01)

(52) U.S. Cl.
  CPC ...... *B62D 65/00* (2013.01); *B65G 2201/0294* (2013.01)

(56) References Cited

U.S. PATENT DOCUMENTS

| | | | |
|---|---|---|---|
| 3,927,619 A * | 12/1975 | Bradley | E01B 25/00 246/448 |
| 5,651,820 A | 7/1997 | Ogasawara et al. | |
| 5,743,962 A | 4/1998 | Ogasawara et al. | |
| 6,254,681 B1 | 7/2001 | Simon et al. | |
| 6,659,262 B2 | 12/2003 | Sagane et al. | |
| 6,745,888 B2 | 6/2004 | Nishida et al. | |
| 9,586,297 B2 | 3/2017 | Kozasa et al. | |
| 10,179,978 B2 | 1/2019 | Schenk et al. | |
| 10,359,234 B2 | 7/2019 | Robbin | |
| 11,279,382 B2 | 3/2022 | Riegraf et al. | |
| 2001/0019004 A1 * | 9/2001 | Sagane | B65G 49/0459 198/345.1 |
| 2003/0201148 A1 | 10/2003 | Sagane et al. | |
| 2006/0054049 A1 * | 3/2006 | Cho | B62D 65/18 104/172.3 |
| 2010/0000440 A1 * | 1/2010 | Meinzinger | E01B 7/00 104/102 |
| 2012/0097099 A1 * | 4/2012 | Roeckle | B65G 49/0463 118/423 |
| 2012/0273624 A1 * | 11/2012 | Meinzinger | E01B 23/06 246/122 R |
| 2014/0021305 A1 * | 1/2014 | Schulze | E01B 23/06 246/415 R |
| 2015/0128397 A1 | 5/2015 | Kozasa et al. | |
| 2016/0016735 A1 | 1/2016 | Binder et al. | |
| 2016/0207717 A1 * | 7/2016 | Senn | B65G 54/02 |
| 2017/0044722 A1 * | 2/2017 | Schenk | B65G 47/64 |
| 2018/0099681 A1 | 4/2018 | Riegraf et al. | |
| 2018/0120028 A1 * | 5/2018 | Robbin | B05B 16/20 |
| 2021/0114636 A1 | 4/2021 | Schulze | |

FOREIGN PATENT DOCUMENTS

| | | | |
|---|---|---|---|
| CN | 102 183 367 | | 9/2011 |
| CN | 104 321 161 | | 1/2015 |
| CN | 107 428 343 | | 12/2017 |
| DE | 1002583 B | * | 6/1955 |
| DE | 10 02 583 | | 2/1957 |
| DE | 197 06 175 | | 8/1998 |
| DE | 694 22 119 T2 | | 8/2000 |
| DE | 10 2006 010 688 | | 9/2007 |
| DE | 10 2013 003 057 | | 8/2014 |
| DE | 10 2015 006 098 | | 11/2016 |
| DE | 10 2016 119 540 | | 4/2018 |
| JP | 01313216 A | * | 6/1988 |
| JP | H01-313216 | | 12/1989 |
| WO | 2016/150543 | | 9/2016 |
| WO | WO-2016180516 A1 | * | 11/2016 ......... B05B 13/0221 |

* cited by examiner

DIP TREATMENT SYSTEM AND METHOD FOR THE DIP TREATMENT OF ARTICLES, IN PARTICULAR VEHICLE BODIES

RELATED APPLICATIONS

The present application is a § 371 national phase of International Patent Application No. PCT/EP2019/061274, filed May 2, 2019, which claims the filing benefit of German Patent Application No. 10 2018 111 202.5, filed May 9, 2018, the contents of both of which are incorporated herein by reference.

FIELD OF THE INVENTION

The invention relates to a dip treatment installation for the treatment of articles, in particular for the treatment of vehicle bodies, having
  a) a dip tank, which can be filled with a treatment liquid into which articles to be treated can be completely or partially dipped;
  b) a conveying system, which defines a conveying path and comprises at least one transport carriage, which can be moved along the conveying path in a transporting direction and has a fastening device to which at least one article can be fastened,
wherein
  c) the conveying system can move the articles to be treated toward the dip tank, completely or partially into the interior space of the dip tank, out of the dip tank and away from said dip tank.

Moreover, the invention relates to a method for the dip treatment of articles, in particular for the dip treatment of vehicle bodies, in which
  a) articles to be treated are dipped completely or partially into a treatment liquid with which a dip tank is filled;
  b) a conveying system defines a conveying path and comprises at least one transport carriage, which is moved along the conveying path in a transporting direction and has a fastening device to which at least one article is fastened,
wherein
  c) the articles to be treated are moved by the conveying system toward the dip tank, completely or partially into the interior space of the dip tank, out of the dip tank and away from said dip tank.

BACKGROUND OF THE INVENTION

Such commercially known dip treatment installations generally comprise a plurality of dip tanks for different dip treatments, for example cleaning, phosphating, dip coating and the like. In particular, in the automotive industry, vehicle bodies are coated with a coating by means of a cataphoretic dip coating operation. In the cataphoretic dip coating operation, the treatment liquid is a coating. In the dip bath, an electrical field forms between the vehicle bodies and anodes which are arranged along a movement path of the vehicle bodies. In this electrical field, the particles of the coating migrate onto the vehicle bodies and are deposited thereon.

In known dip treatment installations, the articles have to move toward and usually also pass through the dip tanks in the order in which said dip tanks are arranged along the conveying path. However, this can lead to unnecessary waiting times in the process sequence. By way of example, an article of a first type may have to spend a longer residence period in a dip tank than an article of a second type, or the residence period of an article may be longer than the cycle rate of the installation actually sought. In relation to the throughput rate, this means that the article of the second type initially has to wait upstream of the dip tank before it can receive its dip treatment.

SUMMARY OF THE INVENTION

It is therefore an object of the invention to provide a dip treatment installation and a method of the type mentioned at the outset which allow a greater degree of flexibility in the process sequence of a dip treatment installation.

Said object is achieved in the case of a dip treatment installation of the type mentioned at the outset in that
  d) the conveying path of the conveying system divides into sub-paths, at least one first sub-path of which leads to the dip tank or to a dipping region of the dip tank, and a second sub-path of which leads past this dip tank or past this dipping region of this dip tank.

The invention is based on the concept that articles to be treated can be overtaken, as it were, by one or more other articles during the process sequence or during the dip treatment of said articles. Thus, when a first article occupies a dip tank and requires a longer residence period in a dip tank than a second article, this second article can be guided past the occupied dip tank on the path via the second sub-path, and optionally can be guided to another dip tank without a build-up occurring at the inlet of the occupied dip tank.

It is favorable if the first and at least one further sub-path run offset with respect to one another in a horizontal direction. This takes account of structural concepts.

The flexibility of the installation is increased further if the first sub-path leads to a first dip tank and at least one further sub-path leads to a further dip tank.

The conveying path preferably divides repeatedly into respectively a first sub-path and at least one second sub-path, the respective first sub-path of which leads to a dip tank respectively assigned to this sub-path or to a dipping region of this assigned dip tank, and the respective second sub-path of which leads past this dip tank or past this dipping region of this dip tank. In this case, a plurality of dip tanks which can be moved around are arranged one behind another in the transporting direction.

It is advantageous if the conveying path comprises a connecting section, to which the sub-paths can be connected and from which the sub-paths can be separated, in each case between two first sub-paths and/or second sub-paths which follow one another in the transporting direction. Sub-paths can thus converge again in the transporting direction.

It can be advantageous if at least one sub-path is in the form of a blind-alley path.

From a conveying technology perspective, it is favorable if the conveying system comprises a switch point system, by means of which a connection of a section of the conveying path to the first sub-path or the second sub-path can be produced or separated in the transporting direction, and by means of which a connection of the first sub-path or the second sub-path to a section of the conveying path can be produced or separated in the transporting direction. Optionally, the respective section can also be another sub-path which precedes or follows a sub-path in the transporting direction.

The switch point system preferably comprises at least one continuous switch point and/or at least one transverse displacement switch point and/or at least one rotating switch point.

The conveying system is particularly preferably in the form of an overhead conveyor system. In particular, a single-track conveying system is favorable here, since track changes can be realized in a less demanding manner there than in the case of multi-track conveying systems.

The object stated above is achieved in the case of the method of the type stated at the outset in that d) the conveying path of the conveying system divides into sub-paths and articles are guided on at least one first sub-path to the dip tank or to a dipping region of the dip tank, and/or articles are guided on a second sub-path past this dip tank or past this dipping region of this dip tank.

A dip treatment installation having some or all of the features explained above is preferably used for this purpose.

BRIEF DESCRIPTION OF THE DRAWINGS

Exemplary embodiments of the invention will be explained below with reference to the drawings, in which.

DETAILED DESCRIPTION OF THE PRESENT INVENTION

In the figures, 10 denotes a dip treatment installation as a whole, which can be in the form for example of a cataphoretic dip coating installation, for the treatment of articles 12. By way of example, in the figures, the articles 12 are shown as vehicle bodies 14, to which reference will be made below and which are in particular bodies for passenger motor vehicles or heavy goods vehicles for conveying passengers and/or goods.

The dip treatment installation 10 comprises a plurality of dip tanks 16 which are filled with a treatment liquid 18 and into which articles 12 to be treated can be completely dipped—such that the articles 12 are thus located completely below the level of liquid—or partially dipped.

Using a conveying system 20, the vehicle bodies 14 are guided through the dip treatment installation 10 and in particular through the dip tanks 16 and the treatment liquid 18 located therein. The conveying system 20 is capable of moving the articles 12 to be treated toward the dip tank 16, completely or partially into the interior space 22 of the dip tank 16, out of the dip tank 16 and away from said dip tank.

The conveying system 20 comprises a multiplicity of transport carriages 24 having a chassis 26 and a fastening device 28, to which at least one article 12 can be fastened. The fastening device 28 is connected to the chassis 26 by means of an adjustment device 30.

Figure 1:
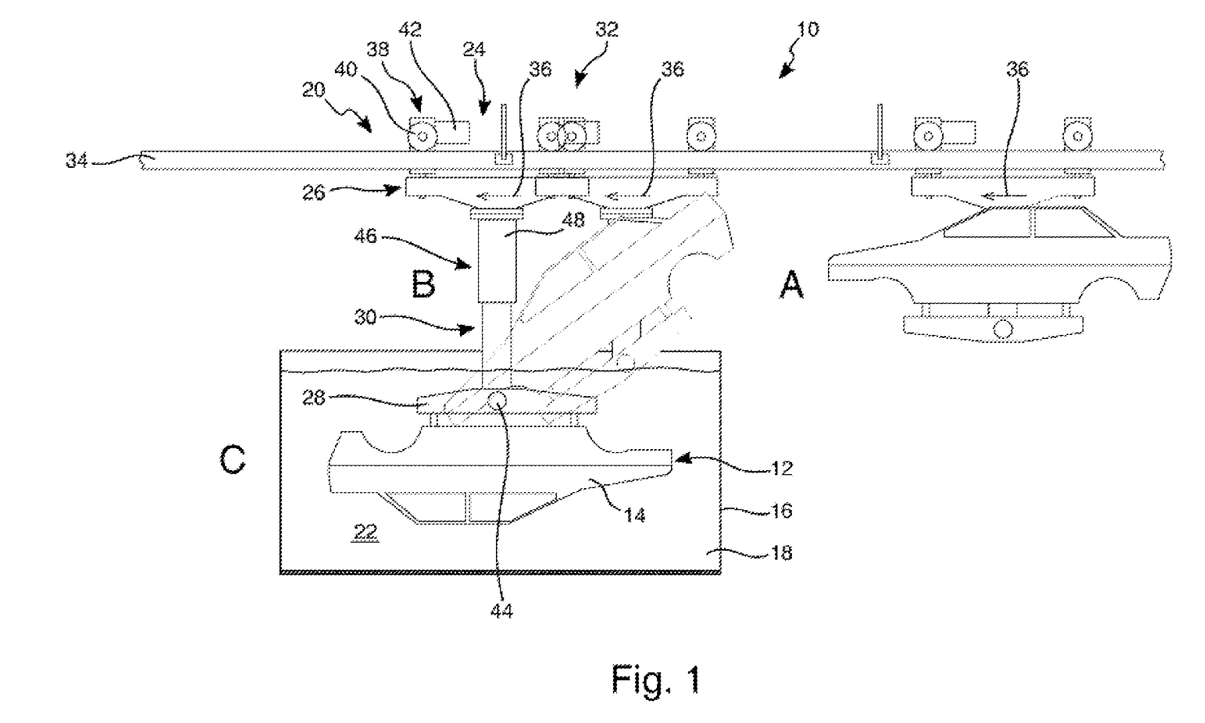
FIG. 1 shows a side view of a dip treatment installation, through which vehicle bodies are conveyed on a transport carriage by means of a conveying system, a dip tank and the transport carriage being shown in three phases of a dip treatment.

FIG. 1 illustrates one and the same transport carriage 24 in three phases A, B and C of a dipping operation, wherein only the transport carriage 24 shown in the third phase C is provided with reference signs. The transport carriages 24 and vehicle bodies 14 shown overlap in FIG. 1 on account of the spatial proximity of phases B and C.

The conveying system 20 is in the form of a single-track overhead conveyor system 32, in which a support rail 34, on which the chassis 26 of the transport carriage 24 runs, extends over the dip tank 16. The transporting direction in which the vehicle bodies 14 are conveyed by means of the conveying system is represented in the figures by an arrow 36. In modifications not specifically shown, the overhead conveyor system 32 can also be a multi-track system.

The chassis 26 is equipped in a manner known per se with guide and support rollers, which are not specifically provided with a reference sign here and roll on various surfaces of the profile of the support rail 34. The transport carriage 24 can be driven by means of a drive device 38. In the present exemplary embodiment, for this purpose at least one of the rollers of the chassis 26 serves as a driving roller 40 which can be turned by an electric motor 42 carried along by the chassis 26. In this way, each transport carriage 24 present can be individually controlled and moved.

Overhead conveyor systems of different constructions, as are known per se, are also possible. Non-overhead conveyor systems are also considered in which, for example, rails run on both sides of the dip tank 16, on which rails the transport carriage with a correspondingly formed chassis can run. Conveying systems of this type for dipping installations are also known per se.

Using the adjustment device 30, the fastening device 28 can on the one hand be raised or lowered in the vertical direction and can on the other hand be rotated about an axis of rotation 44, which runs horizontally and, in the present exemplary embodiment, perpendicular to the transporting direction 36. In the present exemplary embodiment, the adjustment device 30 is in the form of a telescopic device 46 having a telescopic arm 48 which can be extended and retracted in the vertical direction and rotatably mounts the fastening device 28 at its bottom end.

Correspondingly present drives for the telescopic arm 48 and the turning of the fastening device 28 are not specifically shown in the figures.

As a whole, the fastening device 28 and the article 12 fastened thereto can perform a movement which is brought about by a superposition of a horizontal linear movement, a vertical linear movement and a rotation about the axis of rotation 44. This does not mean that this superposition of the three movements always has to be performed; only one or only two of these movement options can also be utilized at the same time in each case.

The mode of operation of the dip coating installation 10 will now be explained briefly with reference to FIG. 1, which illustrates three phases A, B and C of a dipping operation.

The vehicle bodies 14 to be coated are moved in a substantially horizontal orientation, as phase A in FIG. 1 shows, toward the dip tank 16 by energizing the electric motor 42. The fastening device 28 and the vehicle body 14.1 are located in the topmost position here; the telescopic arm 48 is retracted.

When the transport carriage 24 approaches that end face of the dip tank 16 which is located on the inlet side, the telescopic arm 48 is extended, as a result of which the fastening device 28 and the vehicle body 14 fastened thereto are lowered. As soon as the front of the vehicle body 14 projects over the end face of the dip tank 16 above the treatment liquid 18, at the same time the fastening device 28 and the vehicle body 14 are turned about the axis of rotation 44. In this region, the overall movement of the vehicle body 14 is thus to be understood as the above-discussed superposition of three movements, specifically the horizontal linear movement in the transporting direction 36 along the support rail 34, the vertical linear movement, here along the longitudinal axis of the telescopic arm 48, and the rotational movement about the axis of rotation 44, which takes place counterclockwise in the view of FIG. 1. Here, the vehicle body 14 "rolls" over the inlet-side end face of the dip tank 16 and dips into the treatment liquid 18. This is shown by phase B in FIG. 1.

With continued lowering and further rotation of the fastening device 28 or of the vehicle body 14 about the axis of rotation 44, finally a position is reached in which the vehicle body 14 lies on its back "with the roof at the bottom", as is illustrated in FIG. 1 in phase C.

At the latest at the moment in which the vehicle body 14 lies completely "on its back" and thus horizontally again, as is illustrated in FIG. 1, phase C, the vehicle body 14 is dipped completely into the treatment liquid 18. The vehicle body 14 is initially held in this position.

In the case of a dip tank 16 with a relatively large extent in the transporting direction 36, as is illustrated by way of example in FIGS. 2 and 3, by a rinsing tank explained further below, and in FIG. 6, the vehicle body 14 continues to be conveyed through the dip tank 16 initially in this position using the transport carriage 24, until it is brought closer to the outlet-side end face of the dip tank 16.

When the vehicle body 14 was dipped in the treatment liquid 18 for a sufficiently long time or reaches the outlet-side end face of the dip tank 16, the operation of emersion of the vehicle body 14 begins, which in turn is represented as a superposition of three movements, specifically the horizontal linear movement in the transporting direction 36, a vertical movement upwardly along the longitudinal axis of the telescopic arm 48 and the rotational movement about the axis of rotation 44. In this case, the vehicle body 14 "rolls" counterclockwise as a result of further turning about the axis of rotation 44 with retraction of the telescopic arm 48 and thus with an upward movement of the fastening device 28 beyond the outlet-side end face of the dip tank 16, until a horizontal position of the freshly liquid-treated, in the case of a coating the freshly coated, vehicle body 14 is achieved again in the transporting direction 36 downstream of the dip tank 16. This emersion operation is not shown separately.

As an alternative, the vehicle bodies 14 can also be guided through the treatment liquid 18 "with the roof at the top" and dip completely into the treatment liquid 18 in the process. It goes without saying that, during the dipping and emersion operations, the fastening device 28 or the vehicle body 14 is then not rotated by 180° about the axis of rotation 44, but rather no such rotation or only a rocking movement, for example by 45°, about the axis of rotation 44 is performed.

In FIGS. 2-7, which are explained below, the vehicle bodies 14 are shown schematically as a rectangle. When the fastening device 28 can be seen, this means that the respective vehicle body 14 is conveyed "with the roof at the bottom"; this is always the case in FIGS. 2 to 7, in order to illustrate a vehicle body 14 which has been dipped into a correspondingly present dip tank 16.

Figure 2:
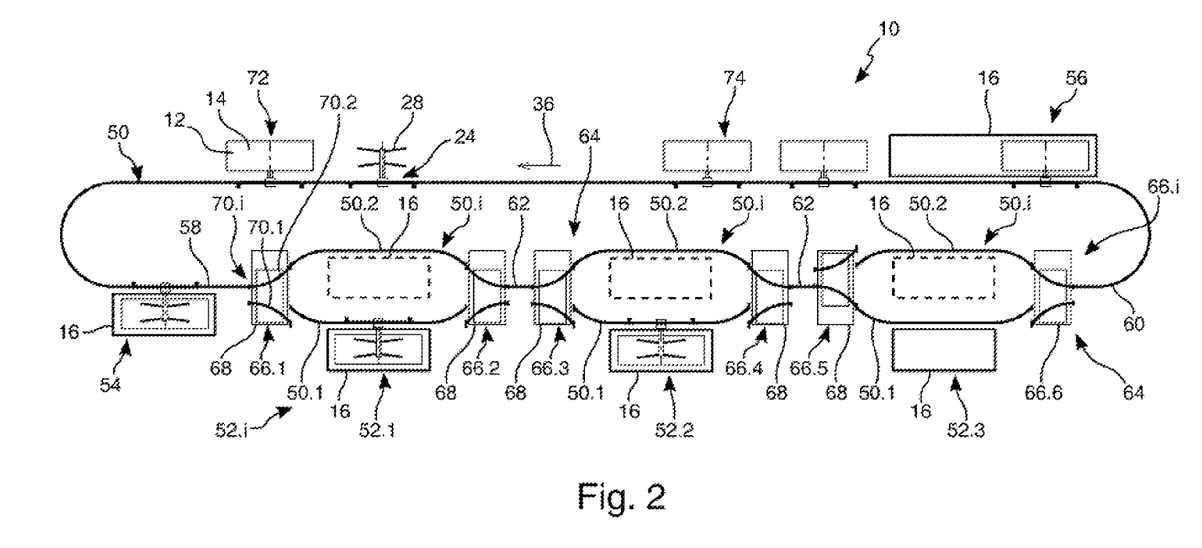
FIG. 2 shows a schematic layout of the dip treatment installation according to a first exemplary embodiment, in which the conveying path divides repeatedly into a first and a second sub-path, for which purpose a switch point system is present.

As can now be seen initially in FIG. 2, the conveying system defines a conveying path 50, along which the transport carriage 24 can be moved. The conveying path 50 leads through a plurality of treatment zones 52.$i$ which are arranged one behind another in the transporting direction 36.

Present in FIG. 2 are three treatment zones 52.1, 52.2 and 52.3, each having a dip tank 16. The actual surface treatment takes place in the treatment zones 52.1, 52.2 and 52.3; in the present exemplary embodiment, a cataphoretic dip coating operation can be carried out in each treatment zone 52.1, 52.2 or 52.3, for which purpose the treatment liquid 18 in the assigned dip tanks 16 is a corresponding coating in each case.

In particular when the dip tanks 16 are designed for a cataphoretic dip coating operation as discussed above, each dip tank 16 which is present comprises, preferably per se, installation components for temperature-controlling, circulating and maintaining the treatment liquid 18 and also the components and structural elements for the required measurement technology, optionally present dialysis cells and in general for the energy supply. In a modification, a plurality of dip tanks 16 can also be interconnected in a suitable way and corresponding resources can be used jointly. Components and structural elements used jointly can be available here either at the same time for a plurality of dip tanks 16 or alternately only ever to one or a smaller number of dip tanks than the number of dip tanks 16 which are present. By way of example, a circulating pump can operate a plurality of dip tanks 16, which are filled with the same type of a treatment liquid 18.

The activity of the components necessary for the operation of a particular dip tank 16 for a dipping operation can also be reduced in terms of output or adjusted if the particular dip tank 16 is not integrated in the process sequence.

Located in the transporting direction 36 upstream of the treatment zones 52.$i$ is a pretreatment zone 54 in which is likewise arranged a dip tank 16, specifically a cleaning tank. The pretreatment zone 54 is a cleaning zone; the treatment liquid 18 in the dip tanks 16 thereof is a cleaning liquid, by means of which the vehicle bodies 14 are cleaned and in particular degreased before they arrive at the treatment zones 52.$i$.

Located in the transporting direction 36 downstream of the treatment zones 52.$i$ is an aftertreatment zone 56 having a further dip tank 16, specifically a rinsing tank. The aftertreatment zone 56 is a rinsing zone; the treatment liquid in the dip tank 16 which is located there is a rinsing liquid, by means of which still adhering liquid residues from the treatment zones 52.$i$ of the surface treatment are removed from the vehicle bodies 14.

All the vehicle bodies 14 are guided through the cleaning tank in the pretreatment zone 54 and through the rinsing tank in the aftertreatment zone 56. A particular vehicle body 14 does not have to pass through all the dip tanks 16 of the treatment zones 52.$i$, however.

The conveying path 50 leads to the treatment zones 52.$i$ via a feed section 58 and away from the treatment zones 52.$i$ via a discharge section 60.

The conveying path 50 repeatedly divides, in the case of the present exemplary embodiment in the individual treatment zones 52.1, 52.2 and 52.3, in each case into sub-paths

50.$i$, one first sub-path 50.1 of which leads to the respective dip tank 16 such that the vehicle bodies 14, which are moved along the respectively first sub-path 50.1, can also complete a dipping operation by way of the respective dip tank 16, as has been described above with reference to FIG. 1.

A respectively second sub-path 50.2 leads past the respective dip tank 16, such that the vehicle bodies 14, which are moved along the respectively second sub-path 50.2, can pass the respective treatment zone 52.1, 52.2 or 52.3 past the assigned dip tank 16 without being guided beyond the assigned dip tank 16 or through the assigned dip tank 16 in a dipping operation. The second sub-path 50.2 defines a bypass route past the respectively considered dip tank 16 in this way.

For this purpose, the first sub-path 50.1 and the second sub-path 50.2 run offset with respect to one another in a horizontal direction. The first sub-path 50.1 and the second sub-path 50.2 thus run spaced apart from one another in a horizontal direction. In this case, the first and the second sub-paths 50.1, 50.2 may run at the same height or at least in certain regions at different heights.

The conveying path 50 comprises a connecting section 62, to which the sub-paths 50.1, 50.2 can be connected and from which the sub-paths 50.1, 50.2 can be separated, in each case between two first sub-paths 50.1 and/or second sub-paths 50.2 which follow one another in the transporting direction 36.

In the case of the present exemplary embodiment, a connecting section 62 is correspondingly provided in each case between the treatment zones 52.1, 52.2 and 52.3 and the sub-paths 50.1, 50.2 located there.

The conveying system 20 comprises a switch point system 64, by means of which a connection of a section of the conveying path 50 to the first sub-path 50.1 or the second sub-path 50.2 can be produced or separated in the transporting direction 36, and by means of which a connection of the first sub-path 50.1 or the second sub-path 50.2 to a section of the conveying path 50 can be produced or separated in the transporting direction 36.

In the present exemplary embodiment, specifically by means of the switch point system 64, a connection of the feed section 58 of the conveying path 50 and the connecting sections 62 in each case to the first sub-path 50.1 which follows in the transporting direction 36 or to the second sub-path 50.2 which follows in the transporting direction 36 can be produced or separated, and a connection of each first sub-path 50.1 and each second sub-path 50.2 to the connecting section 62 which follows in the transporting direction 36 and/or, in the case of the treatment zone 52.$i$ which is last in the transporting direction 36, to the discharge section 60 can be produced or separated.

The transport carriages 24 can thereby be fed in each treatment zone 52.1, 52.2 or 52.3 using the switch point system 64 selectively to the first sub-path 50.1 or the second sub-path 50.2 and from there can be fed again to the connecting sections 62 and/or—downstream of the treatment zone 52.$i$ which is last in the transporting direction 36—can be fed again to the discharge section 60 of the conveying path 50.

Switch point units 66.$i$ are arranged at the inlet side and at the outlet side of each treatment zone 52.$i$, with the result that two switch point units 66.$i$ are located in each case between two treatment zones 52.$i$. Thus, in the case of the three treatment zones 52.1, 52.2 and 52.3 which are present, overall there are six switch point units 66, which are denoted in figure in the transporting direction 36 by 66.1, 66.2, 66.3, 66.4, 66.5 and 66.6.

In the exemplary embodiment according to FIG. 2, according to a first type, the switch point units 66.$i$ are in the form of a continuous switch point 68 with switch point sections 70.$i$, wherein the number of switch point sections 70.$i$ matches the number of sub-paths 50.$i$ which are present. In the present case, in each switch point unit 66.$i$ two switch point sections 70.1 and 70.2 are correspondingly present. For the sake of clarity, the switch point sections 70.$i$, 70.1 and 70.2 are only labelled at the inlet of the first treatment zone 52.1 in the case of the switch point unit 66.1. The switch point sections 70.$i$ run in such a manner that the switch point units 66.$i$ can be passed through in any case without stopping the transport carriage 24, since the switch point units 66.$i$ can always be brought into the required position with respect to the first or to the second sub-path 50.1, 50.2 before the transport carriage 24 reaches the switch point unit 66.$i$.

In addition to the treatment zones 52.$i$, the pretreatment zone and the aftertreatment zone 56, a charging zone 72 and a releasing zone 74 are provided. In the charging zone 72, vehicle bodies 14 are transferred from a preceding installation section, in particular from the pre-assembly operation in which the bodyshell is assembled, to an unloaded transport carriage 24 in each case and fastened thereto. FIG. 2 shows only a single unloaded transport carriage 24. In the releasing zone 74, vehicle bodies 14 which have passed through their treatment in the zones 54, 52.$i$ and 56 are correspondingly removed from a transport carriage 24.

In FIG. 2, by way of example, the dip tanks 16 in the first treatment zone 52.1 and in the second treatment zone 52.2 are now occupied, i.e. a transport carriage 24 is located in each case on the respectively first sub-path 50.1 at these dip tanks 16 and a vehicle body 14 is respectively dipped there "with the roof at the bottom"; therefore, the fastening device 50 can be seen in each case. Moreover, a transport carriage 24 with a vehicle body 14 is located in the pretreatment zone 54.

The switch point units 66.$i$ in the treatment zones 52.1, 52.2 and 52.3, likewise by way of example, are shown in positions such that that transport carriage 24 which is located in the pretreatment zone 54 is guided on its continued path on the sub-paths 50.2 of the first treatment zone 52.1 and the second treatment zone 52.2 past the dip tanks 16 located there, but in the third treatment zone 52.3 is guided on the first sub-path 50.1 located there and thus to the dip tank 16 assigned there.

If now, for example, the treatment of the vehicle body 14 in the first treatment zone 52.1 has concluded, the switch point unit 66.2 at the outlet of the first treatment zone 52.1 is brought into a position in which the first sub-path 50.1 of the first treatment zone 52.1 is connected to the connecting section 62 which follows in the transporting direction 36. Moreover, the switch point unit 66.5 at the inlet of the third treatment zone 52.3 is brought into a position in which the connecting section 62 between the second and the third treatment zone 52.2, 52.3 is connected to the second sub-path 50.2 of the third treatment zone 52.2.

The vehicle body 14 can now be moved out of the dip tank 16 in the first treatment zone 52.1 and conveyed past the dip tanks 16 in the second and the third treatment zone 52.2, 52.3 to the aftertreatment zone 56.

A subsequent vehicle body 14 can then be dipped into the now-empty dip tank 16 of the first treatment zone 52.1 after cleaning in the pretreatment zone 54 has taken place, for which purpose the switch point unit 66.$i$ at its input is correspondingly repositioned beforehand.

Figure 3:
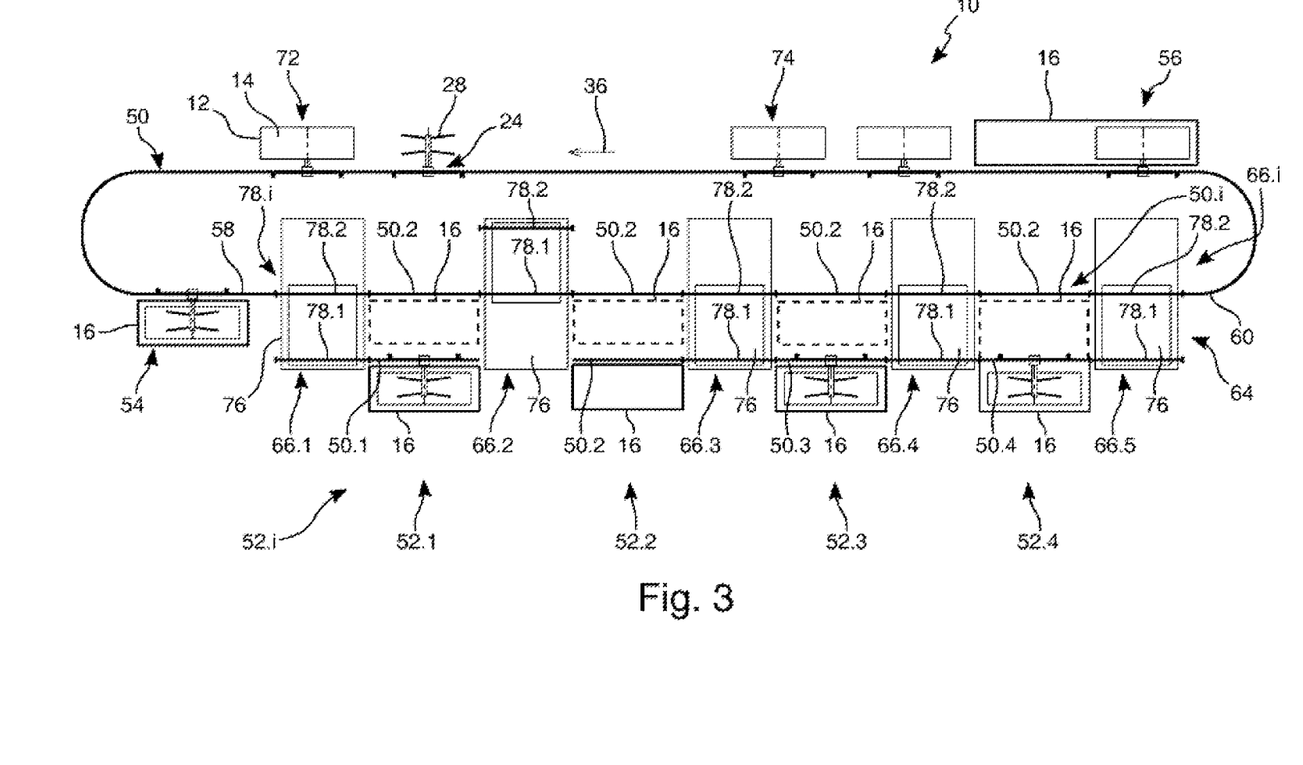
FIG. 3 shows the layout of the dip treatment installation according to FIG. 2 with a modified switch point system.

FIG. 3 shows a further exemplary embodiment of the dip treatment installation 10. On the one hand, provided there in addition in the transporting direction 36 is a fourth treatment zone 52.4 likewise with a dip tank 16. On the other hand, the switch point units 66.$i$, according to a second type, are in the form of transverse displacement switch points 76 with switch point sections 78.$i$, the number of switch point sections 78.$i$ here also matching the number of sub-paths 50.$i$ which are present. In the present case, in the case of each transverse displacement switch point 76 two switch point sections 78.1 and 78.2 are correspondingly present which can be displaced to and fro between two sections of the travel path 50 that are to be connected. The switch point sections 78.$i$ run in such a manner that the switch point units 66.$i$ can no longer be passed through in any case without stopping the transport carriage 24. In the present exemplary embodiment, the switch point sections 78.$i$ run in a straight line and in parallel. For the sake of clarity, the switch point sections 70.$i$, 70.1 and 70.2 are also here labelled only in the case of the switch point unit 66.1 at the inlet of the first treatment zone 52.1.

This concept does not provide any connecting sections 62 of the conveying path 50 and only one switch point unit 66.$i$ in the form of a transverse displacement switch point 76 is present in each case between the treatment zones 52.$i$; the sub-paths 50.1, 50.2 of two treatment zones 52.$i$ which follow one another are linked to one another directly by a transverse displacement switch point 76. For this reason, in this concept only one more transverse displacement switch point 76 than there are treatment zones 50 is necessary. In the switch point concept with the continuous switch points 68 that is illustrated with reference to FIG. 2, by contrast, twice as many switch point units 66.$i$ as there are treatment zones 50 are necessary.

Thus, for the four treatment zones 52.1, 52.2, 52.3 and 52.4 which are present, overall there are five switch point units 66.$i$ in the form of the transverse displacement switch points 76, which are denoted in FIG. 3 in the transporting direction 36 by 66.1, 66.2, 66.3, 66.4 and 66.5.

In a first position of the transverse displacement switch points 76, respectively the first switch point section 78.1 thereof is connected to a first sub-path 50.1 and the second switch point section 78.2 thereof is connected to a second sub-path 50.2 of the conveying path 50. In a second position of the transverse displacement switch point 76, the first switch point section 78.1 thereof is connected to a second sub-path 50.2 and the second switch point section 78.2 thereof is not connected to a sub-path 50.1 or 50.2 of the conveying path 50. In the case of the transverse displacement switch points 76 between the treatment zones 52.$i$, in the first position of a transverse displacement switch point 76 respectively the first sub-paths 50.1 of two adjacent treatment zones 52.$i$ are thus connected by the first switch point section 78.1 and the second sub-paths 50.2 of these treatment zones 52.$i$ are thus connected by the second switch point section 78.2. In the case of the transverse displacement switch points 76 upstream of the first treatment zone 52.1 and downstream of the last treatment zone 52.4, the first switch point section 78.1 in the first position is connected only to the first sub-path 50.1 of the respectively adjacent treatment zone 52.1 or 52.4, whereas the respective second switch point section 78.2 connects the feed section 58 to the second sub-path 50.2 of the first treatment zone 52.1 and the second sub-path 50.2 of the last treatment zone 52.4 to the discharge section 60 of the conveying path 50.

In FIG. 3, by way of example, the dip tanks 16 in the first, the third and the fourth treatment zones, 52.1, 52.3 and 52.4 respectively, are occupied, i.e. a transport carriage 24 is located in each case on the respectively first sub-path 50.1 at this dip tank 16 and a vehicle body 14 is respectively dipped there "with the roof at the bottom". Moreover, a transport carriage 24 with a vehicle body 14 is located in the pretreatment zone 54. The dip tank 16 in the second treatment zone 52.2 is unoccupied.

The switch point unit 66.1 at the input of the first treatment zone 52.1 assumes its second position, in which the second switch point section 78.2 is in line with the feed section 58 of the conveying path 50 and connects said feed section to the second sub-path 50.2 of the first treatment zone 52.1. On its way to the empty dip tank 16 of the second treatment zone 52.2, the transport carriage 24 moves out of the pretreatment zone 54 initially as far as the second switch point unit 66.2 and moves on the first switch point section 78.1 thereof and stops there, for which purpose the second switch point unit 66.$i$ assumes its first position. Then, the transport carriage 24 together with the first rail section 78.1 of the switch point unit 66.2 is displaced with respect to the second sub-path 50.2 of the second treatment zone 52.2, on which second sub-path the transport carriage 24 can then move and thus can arrive at the dip tank 16 located there, in order to be dipped there.

Correspondingly, transport carriages 24 are conveyed to the dip tanks 16 in the rest of the treatment zones 52.1, 52.3 or 52.4 or in the treatment zones in general past the dip tanks 16 located there by virtue of the transverse displacement switch points 76 assuming a respectively suitable position.

In principle, each transverse displacement switch point 76 also functions with only a single rail section. The multisection concept explained, however, makes it possible to move a transport carriage 24 to a dip tank 16, but at the same time to produce the travel path past the assigned dip tank.

In FIGS. 2 and 3, as an alternative addition, each second sub-path 50.2 of the treatment zones 52.1 to 52.3 or 52.1 to 52.4 which are present is also respectively assigned a dip tank 16, shown by dashed lines, in which a dip treatment of a vehicle body 14 can likewise be performed in a corresponding manner in each case.

In this case, the designations first sub-path and second sub-path are defined with reference to the dip tank 16 under consideration. If thus the dip tank at the sub-path denoted by 50.2 is considered, the sub-path 50.2 is the first sub-path, which by definition leads to the dip tank 16 under consideration, and the sub-path denoted by 50.1 is the second sub-path, which by definition leads past this dip tank 16.

The same applies correspondingly if more than two sub-paths 50.$i$ are present, which respectively lead to a dedicated dip tank 16. This will be addressed again further below in relation to FIGS. 4 and 5.

If a dip tank 16 is present in each case at each sub-path 50.1 and 50.2 of an assigned treatment zone 52.$i$ and a vehicle body 14 is dipped there in each case, this treatment zone 52.$i$ can no longer be passed by another transport carriage 24.

In the dip treatment installation 10 according to FIG. 3, illustrated in the fourth treatment zone 52.4 further additionally as an alternative is the situation in which the one dip tank 16 can also have a wide enough form that it can be reached on both sub-paths 50.1 and 50.2 by a vehicle body 14. Shown there, instead of respectively one dip tank 16 at the sub-path 50.1 and at the sub-path 50.2, is a correspondingly wide dip tank 16 which extends in the direction transverse to the transporting direction 36 over both sub-paths 50.1 and 50.2 located there. In such cases, a respective sub-path 50.1, 50.2 leads to a dipping region of the dip tank in each case, the respectively other sub-path 50.2, 50.1 leading past this dipping region of the dip tank 16.

In both exemplary embodiments according to FIGS. 2 and 3, more than two sub-paths 50.i can also be present in each treatment zone 52.i or in some of the treatment zones 52.i. The switch point units 66.i can then also have a corresponding number of switch point sections 70.i in the case of the continuous switch points 68 or of switch point sections 78.i in the case of the transverse displacement switch points 76. The number of dip tanks 16 in each treatment zone 52.2 can also be increased correspondingly.

In the dip treatment installations 10 shown in FIGS. 2 and 3, dip tanks 16 are arranged one behind another in the transporting direction 36. If the optional dip tanks 16, shown by dashed lines, are not provided, this applies at least for some of the dip tanks 16 present, otherwise there are always the corresponding groups of dip tanks 16 which are arranged next to one another as viewed in the transporting direction 36.

Figure 4:
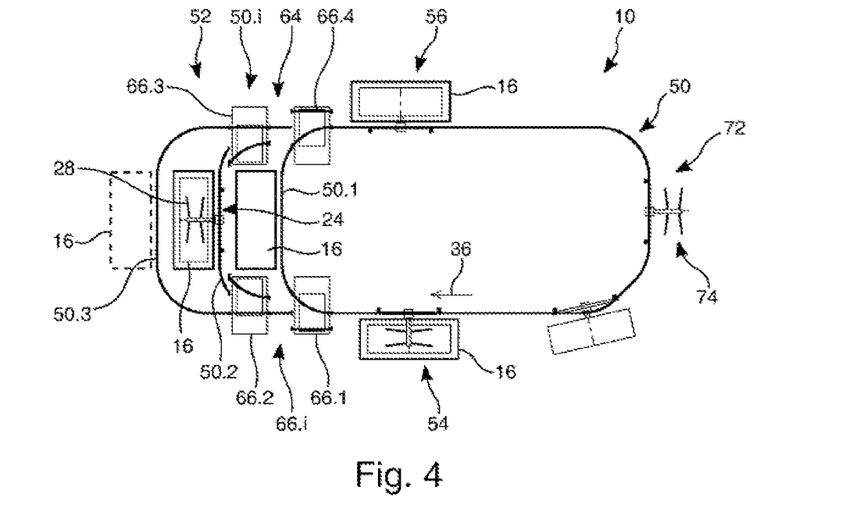
FIG. 4 shows a schematic layout of a dip treatment installation according to one exemplary embodiment, in which the conveying path divides into more than two sub-paths.
Figure 5:
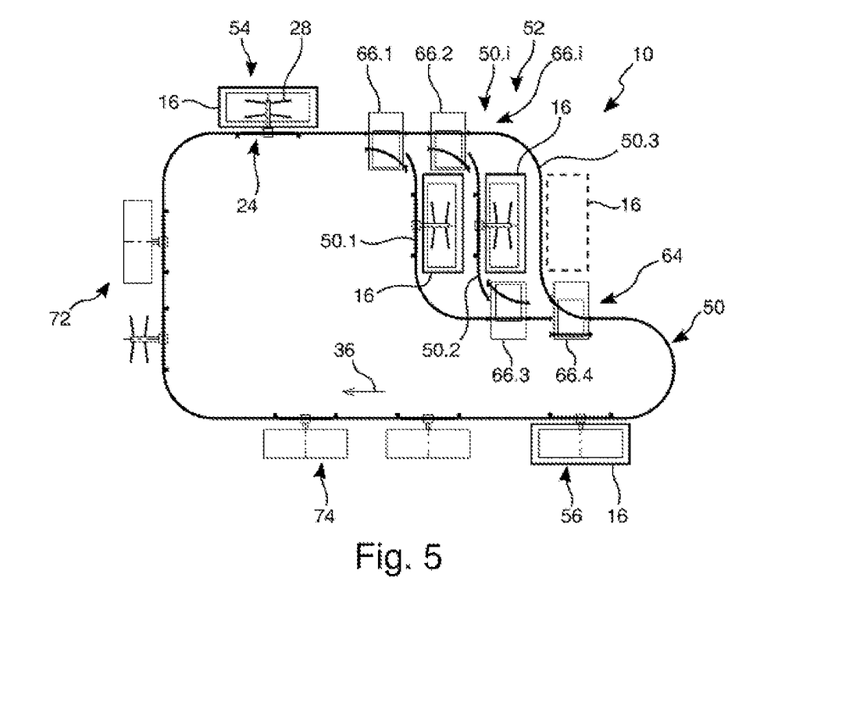
FIG. 5 shows a schematic layout of a further modified dip treatment installation in which the conveying path likewise divides into more than two sub-paths.

By contrast to this, FIGS. 4 and 5 show a dip treatment installation 10 in each case, in which all dip tanks 16 present are arranged next to one another in this way. In the two exemplary embodiments, two dip tanks 16 and also a further optional dip tank 16 are each shown by dashed lines. In FIGS. 4 and 5, all the components and structural elements are no longer provided with reference signs.

In this installation layout, in principle only one treatment zone 52 is shown in each case, in which the travel path 50 divides into more than two sub-paths 50.i, as has already been explained above in relation to the exemplary embodiments of FIGS. 2 and 3, this design not being shown in the figures. The travel path 50 specifically divides into three sub-paths 50.1, 50.2 and 50.3 in the case of the dip treatment installations according to FIGS. 4 and 5.

If the dip tank 16 at the sub-path 50.2, which is central here, is thus considered, this sub-path 50.2 is the first sub-path, which leads to the dip tank 16 under consideration, whereas each of the sub-paths 50.1 and 50.3 defines a second sub-path, which leads past this dip tank 16.

In the dip treatments according to FIGS. 4 and 5, in the case of three sub-paths 50.i, four switch point units 66.i are present which are denoted by 66.1, 66.2, 66.3, 66.4. In the case of such a parallel guidance of the sub-paths 50.i, only ever one more switch point unit 66.i than there are sub-paths 50.i is necessary.

Figure 6:
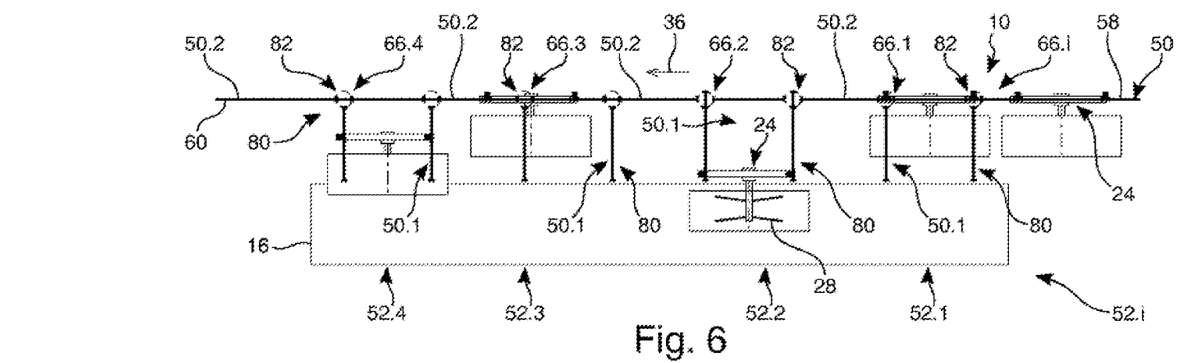
FIG. 6 shows a schematic layout of the dip treatment installation according to a further exemplary embodiment in which a sub-path is in the form of a blind alley ending at the dip tank.

As a further exemplary embodiment, FIG. 6 shows a dip treatment installation 10 in which sub-paths of the conveying path 50 that lead to a dip tank 16 are in the form of blind-alley paths 80.

Said blind-alley paths can be reached by a transport carriage 24 in each case via switch point units 66.i of the switch point system 64 which are designed as a rotating switch point in the form of a rotating rail device 82 and are designed in a complementary manner to the blind-alley paths 80 and the transport carriages 24. In this concept, the transport carriages 24 have to be modified if appropriate in such a manner that they can change direction correspondingly; in particular, for this purpose, the support rollers by means of which the chassis 26 rolls on the support rail 34 have to be mounted rotatably about a vertical axis. The blind-alley paths 80 are shown here by way of example as a two-track system, such that an interaction with the transport carriage 24 according to FIG. 1 is possible in which the drive roller 40 and a further support roller (not individually labelled) run on the support rail 34. In modifications which are not shown individually and in the case of a correspondingly formed transport carriage 24, a blind-alley path 80 can also be in the form of just a single-track system.

At each switch point unit 66.i, the conveying path 50 divides into a sub-path 50.1, which forms a blind-alley path 80 and leads to the assigned dip tank 16, and a sub-path 50.2, which leads past this dip tank 16. In this way, a plurality of treatment zones 52 can again be defined; in the present exemplary embodiment, four treatment zones 52.1, 52.2, 52.3 and 52.4 are shown.

In FIG. 6, only a single dip tank 16 is shown which extends over all treatment zones 52, with the result that here the sub-paths 50.1 which are present again lead to respective dipping regions of this dip tank 16 and the respectively present sub-paths 50.2 lead past these dipping regions.

Figure 7:
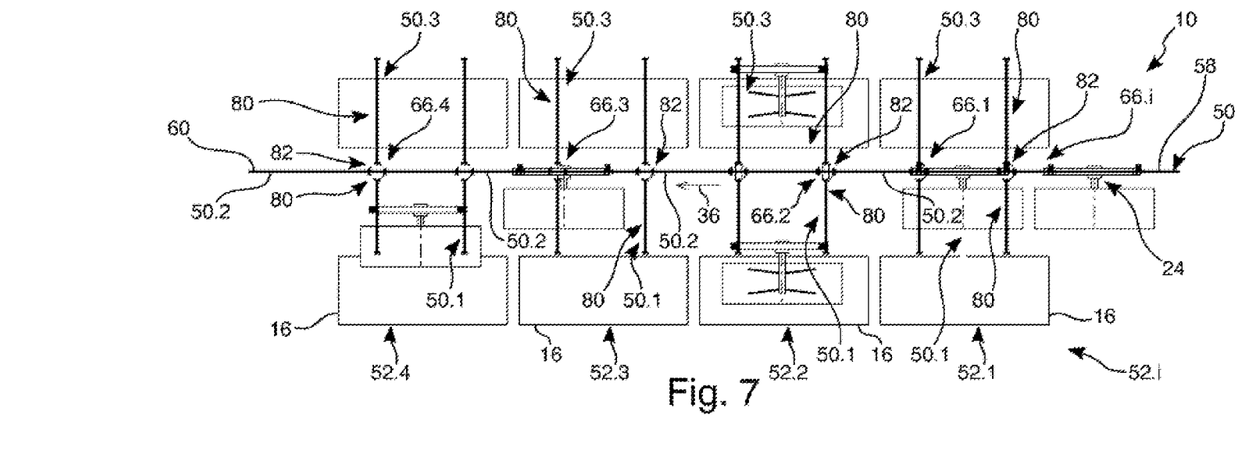
FIG. 7 shows a schematic layout of the dip treatment installation according to a modification in which sub-paths which point in opposite directions are in the form of blind alleys each ending at a dip tank.

In the exemplary embodiment according to FIG. 7, respectively separated dip tanks 16 are again present, the conveying path 50 dividing at each switch point unit 66.i into three sub-paths 50.1, 50.2 and 50.3, two of which being in the form of blind-alley paths 80 which lead to a dip tank 16 in the manner described above.

In all of the exemplary embodiments explained above, all the sections of the conveying path 50, i.e. the sub-paths 50.i, the feed section 58, the discharge section 60, the connecting sections 62, the switch point sections 70.i, 78.i and also the blind-alley paths 80 and the rotating rail devices 82, are formed by corresponding rail sections, which as a whole provide the guide rails 34 of the conveying system 20.

In all variants of the switch point system 64, lateral supporting guides can be provided for the transport carriages 24 in particular at the section transitions, which support guides reduce and at best largely prevent sideward oscillations of the transport carriages 24 or of the articles 12 fastened thereto. For this purpose, the transport carriages 24 can carry along, for example, guide arms with rollers at the ends, which can thread into corresponding guide rails. Such rails can run laterally offset with respect to the course of the support rail 34 in the respective section or else underneath it.

In practice, at least two dip tanks 16 are filled with the same type of a treatment liquid 18 in order to obtain the advantage achieved by the overtaking opportunity thus provided.

The treatment liquid 18 in two or more dip tanks 16 which are present can however also be different and the sub-paths 50.i can realize a variety of sequences in which the dip tanks 16 thus filled with different treatment liquids 18 are approached or are passed through by the articles 12. A first dip tank 16 filled with a first treatment liquid 18 can then for example also initially be passed through, which dip tank is arranged downstream of a second dip tank 16 with another treatment liquid as viewed along the conveying path 50 in the transporting direction 36. For this purpose, the article 12 in question is conveyed on the conveying path 50 in a circle back to the section of the conveying path 50 with the dip tanks 16, in order to arrive on this path at the required second dip tank 16.

In practice, at least two dip tanks 16 are also of the same size and complement as many articles to be treated as possible. However, it is also possible for a plurality of dip tanks of different sizes to be present which, although they are filled with the same type of a treatment liquid, are only passed through by certain articles 12 in each case. Dip tanks 16 of different sizes can also accommodate different treatment liquids 18. The variant in which two or more sub-paths 50.i divide one dip tank 16 is explained above.

Since articles 12 to be treated can mutually overtake on the conveying path 50, it is possible that the articles 12 arrive at the releasing zone 74 in a different order than the one in which they have been brought on the conveying path 50 into the charging zone 72. The order in the treatment zones 52 can also repeatedly change.

If a plurality of dip tanks 16 with the same type of a treatment liquid 18 are present, a redundancy is furthermore formed. If a dip tank 16 is not available due to necessary maintenance, whether it be on account of a disruption or on account of a regularly required maintenance measure, one or more other dip tanks can be resorted to.

Finally, treatment parameters for a specific dip tank 16 and for an article 12 located therein can be adapted in real time if a real-time measurement of monitoring parameters, in the case of a cataphoretic dip coating for example the current strength, the residence period, the movement pattern, the bath flow and the like, shows that deviations from the planned treatment result are to be expected.

What is claimed is:

1. A dip treatment installation for the treatment of articles, comprising:
    a) a dip tank, which can be filled with a treatment liquid into which articles to be treated can be completely or partially dipped;
    b) a conveying system, which defines a conveying path and comprises at least one transport carriage which can be moved along the conveying path in a transporting direction and has a fastening device to which at least one article can be fastened, the conveying path of the conveying system dividing into sub-paths, at least one first sub-path of which leads to the dip tank or to a dipping region of the dip tank, and a second sub-path of which leads past the dip tank or past the dipping region of the dip tank, wherein the conveying system can move the articles to be treated along the at least one first sub-path completely or partially into the interior space of the dip tank, out of the dip tank and away from said dip tank; and
    c) a plurality of connecting sections, each connecting section selectively connecting the at least one first sub-path or the second sub-path to the conveying path, each connecting section comprising at least a first switch point section and a second switch point section, the first switch point section being spaced apart from the second switch point section wherein, for each connecting section,
        the first switch point section connects the at least one first sub-path to the conveying path and the second switch point section is physically removed from the conveying path while the at least one first sub-path is connected to the conveying path; and
        the second switch point section connects the second sub-path to the conveying path and the first switch point section is physically removed from the conveying path when the second sub-path is connected to the conveying path so that articles conveyed by the conveying system can continue along the conveying path via the second switch point section and second sub path even when the at least one first sub-path or the dip tank are occupied by an article,
        wherein each connecting section connects the first sub-path or the second sub-path to the conveying path independent of all other connecting sections from the plurality of connecting sections.

2. The dip treatment installation as claimed in claim 1, wherein the at least one first sub-path and the second sub-path run offset with respect to one another in a horizontal direction.

3. The dip treatment installation as claimed in claim 1, wherein the at least one first sub-path leads to the dip tank and one or more of the second sub-path or at least one further sub-path leads to a further dip tank.

4. The dip treatment installation as claimed in claim 1, wherein the conveying path divides repeatedly into a first sub-path and at least one second sub-path, each respective first sub-path leading to a dip tank assigned to this sub-path or to a dipping region of this assigned dip tank, and each respective second sub-path leading past each respective dip tank or past each respective dipping region of each respective dip tank wherein at least one connecting section from the plurality of connecting sections precedes each first sub-path and each second sub-path, and at least one connecting section from the plurality of connecting sections follows each first sub-path and each second sub-path.

5. The dip treatment installation as claimed in claim 1, wherein at least one sub-path is in the form of a blind-alley path.

6. The dip treatment installation as claimed in claim 1, wherein one or more of each first switch point connection or each second switch point connection comprise at least one continuous switch point and/or at least one transverse displacement switch point and/or at least one rotating switch point.

7. The dip treatment installation as claimed in claim 1, wherein the conveying system is in the form of an overhead conveyor system.

8. A method for the dip treatment of articles, comprising the steps of:
    a) dipping articles to be treated completely or partially into a treatment liquid with which a dip tank is filled;
    b) providing a conveying system which defines a conveying path and comprises at least one transport carriage, which is moved along the conveying path in a transporting direction and has a fastening device to which at least one article is fastened, the conveying path of the conveying system dividing into sub-paths, and articles are guided on at least one first sub-path to the dip tank or to a dipping region of the dip tank, and/or articles are guided on a second sub-path past this dip tank or past this dipping region of this dip tank even when the dip tank or the region of the dip tank is occupied;
    c) selectively connecting and disconnecting
        a. a first switch point section to connect and disconnect the at least one first sub-path to move the articles to be treated by the conveying system toward the dip tank, completely or partially into the interior space of the dip tank, out of the dip tank and away from said dip tank, and
        b. a second switch point section to connect and disconnect the second sub-path to provide a bypass route for the articles to be treated around the dip tank or the dipping region of the dip tank, wherein
            only one of the first switch point section or the second switch point section are physically connected to the conveying path at any given time;
    d) selectively connecting and disconnecting
        a. a third switch point section to connect and disconnect the at least one first sub-path to allow articles to return to the second-path from the dip tank or continue along the second sub-path, and
        b. a fourth switch point section to connect the second sub-path to a second first sub-path to move articles to be treated toward a second dip tank, completely or partially into the interior space of the second dip tank, out of the second dip tank and away from said dip tank, wherein
only one of the third switch point section or the fourth switch point section are physically connected to the conveying path at any given time, and the first switch point section and the second switch point section are selectively connected and disconnected independent of the third switch point section and the fourth switch point section.

9. A dip treatment installation for the treatment of articles, comprising:
a) a dip tank, which can be filled with a treatment liquid into which articles to be treated can be completely or partially dipped;
b) a conveying system, which defines a conveying path and comprises at least one transport carriage which can be moved along the conveying path in a transporting direction and has a fastening device to which at least one article can be fastened, the conveying path of the conveying system having at least three sub-paths, at least one first sub-path of which leads to the dip tank or to a dipping region of the dip tank, and a second sub-path of which leads past the dip tank or past the dipping region of the dip tank, wherein the conveying system can move the articles to be treated along the at least one first sub-path completely or partially into the interior space of the dip tank, out of the dip tank and away from said dip tank;
c) a first connecting section comprising at least a first switch point section and a second switch point section, the first switch point section being parallel to the second switch point section, wherein
the first switch point section moves the at least one transport carriage between the at least one first sub-path and the second sub-path; and
the second switch point section connects the second sub-path to the conveying path when the first switch point section is moved to the at least one first sub-path so that any additional transport carriages may continue along the second sub-path via the second switch point section even when the first switch point section has moved the at least one transport carriage to the at least one first sub-path;
d) a second connecting section comprising at least a third switch point section and a fourth switch point section, the third switch point section being parallel to the fourth switch point section, wherein
the third switch point section moves the at least one transport carriage between the at least one first sub-path and the second sub-path;
the fourth switch point section connects the second sub-path to the conveying path when the third switch point section has moved the at least one transport carriage to the at least one first sub-path so that any additional transport carriages may continue along the second sub-path path via the fourth switch point section even when the third switch point section has been moved to the at least one first sub-path, and
the second connecting section and the first connecting section are movable independent of one another.

10. The dip treatment installation of claim 9 comprising a plurality of dip tanks along the at least one first sub-path and a plurality of connecting sections, wherein each dip tank is preceded and followed by a connecting section, and each connecting section is operable independent of any other connecting section.

11. A dip treatment installation for the treatment of articles, comprising:
a) a dip tank, which can be filled with a treatment liquid into which articles to be treated can be completely or partially dipped;
b) a conveying system, which defines a conveying path and comprises at least one transport carriage which can be moved along the conveying path in a transporting direction and has a fastening device to which at least one article can be fastened, the conveying path of the conveying system having a main path, a first sub-path of which leads to the dip tank or to a dipping region of the dip tank, and a second sub-path of which leads to a second dip tank or to a second dipping region of the dip tank, wherein each sub-path comprises two parallel tracks and articles to be treated along each sub-path are completely or partially submerged into the interior space of the dip tank and/or the second dip tank, out of the dip tank and/or the second dip tank, and away from the dip tank and/or the second dip tank via the first or second sub-path;
c) a first connecting section comprising at least two rotating rail devices, wherein
in a first position the at least two rotating rail devices allow the at least one transport carriage to continue along the main path; and
in a second position the at least two rotating rail devices connect the main path to the first sub-path and direct the at least one transport carriage to the first sub-path; and
d) a second connecting section comprising at least two second sub-path rotating rail devices, wherein
in a first position the at least two second sub-path rotating rail devices allow the at least one transport carriage to continue along the main path;
in a second position the at least two second sub-path rotating devices connect the main path to the second sub-path and direct the at least one transport carriage to the second sub-path, wherein
the first connecting section and second connecting section are operable independent from one another.

* * * * *